US011890887B2

(12) United States Patent
Lehmann

(10) Patent No.: US 11,890,887 B2
(45) Date of Patent: Feb. 6, 2024

(54) LASER PRINTING PROCESS

(71) Applicant: Heliosonic GmbH, Wesel (DE)

(72) Inventor: Udo Lehmann, Wesel (DE)

(73) Assignee: Heliosonic GmbH, Wesel (DE)

( * ) Notice: Subject to any disclaimer, the term of this patent is extended or adjusted under 35 U.S.C. 154(b) by 765 days.

(21) Appl. No.: 16/964,690

(22) PCT Filed: Jan. 22, 2019

(86) PCT No.: PCT/EP2019/051508

§ 371 (c)(1),
(2) Date: Jul. 24, 2020

(87) PCT Pub. No.: WO2019/145300

PCT Pub. Date: Aug. 1, 2019

(65) Prior Publication Data

US 2021/0053378 A1 Feb. 25, 2021

(30) Foreign Application Priority Data

Jan. 27, 2018 (DE) ..................... 10 2018 000 653.1

(51) Int. Cl.

| | |
|---|---|
| ***B41M 5/382*** | (2006.01) |
| ***B41J 2/005*** | (2006.01) |
| ***B41M 5/26*** | (2006.01) |
| ***B41M 5/36*** | (2006.01) |
| ***B41M 5/385*** | (2006.01) |

(52) U.S. Cl.

CPC .......... *B41M 5/38228* (2013.01); *B41J 2/005* (2013.01); *B41M 5/262* (2013.01); *B41M 5/36* (2013.01); *B41M 5/385* (2013.01)

(58) Field of Classification Search

CPC .... B41M 5/38228; B41M 5/262; B41M 5/36; B41M 5/385; B41M 5/38207; B41J 2/005
USPC ..................................... 430/270.1, 204, 339
See application file for complete search history.

(56) References Cited

U.S. PATENT DOCUMENTS

| | | | |
|---|---|---|---|
| 5,021,808 | A | 6/1991 | Kohyama |
| 5,312,683 | A | 5/1994 | Chou et al. |
| 5,459,016 | A | 10/1995 | Debe et al. |
| 5,516,622 | A | 5/1996 | Savini et al. |
| 5,518,861 | A | 5/1996 | Coveleskie et al. |
| 6,222,567 | B1 | 4/2001 | Schuster et al. |
| 6,241,344 | B1 | 6/2001 | Machida |

(Continued)

FOREIGN PATENT DOCUMENTS

| | | |
|---|---|---|
| CN | 102576576 | 7/2012 |
| DE | 10210146 A1 | 9/2003 |

(Continued)

OTHER PUBLICATIONS

International Search Report and Written Opinion for International Patent Application No. PCT/EP2019/051508 dated Apr. 9, 2019 (12 pages).

*Primary Examiner* — Caleen O Sullivan
(74) *Attorney, Agent, or Firm* — Fitch, Even, Tabin & Flannery LLP

(57) ABSTRACT

Printing process in which a substrate to be printed is disposed opposite an ink carrier having an ink layer, wherein the ink layer is regionally heated in such a way that bulges are formed in the ink layer, wherein the bulges contact the substrate and wherein ink splitting is brought about by relative movement between substrate and ink carrier.

21 Claims, 3 Drawing Sheets

(56) References Cited

U.S. PATENT DOCUMENTS

| | | | | |
|---|---|---|---|---|
| 8,922,611 | B1 | 12/2014 | Benton | |
| 10,603,925 | B2 * | 3/2020 | Suzuki | C03C 8/02 |
| 2003/0227517 | A1 * | 12/2003 | Yaron | B41J 2/14104 347/51 |
| 2006/0181600 | A1 | 8/2006 | Bourdelais | |
| 2007/0279469 | A1 * | 12/2007 | Regan | B41J 2/0057 347/77 |
| 2011/0298878 | A1 * | 12/2011 | Kleine | B41M 5/38221 347/103 |
| 2011/0310205 | A1 | 12/2011 | Jaeger | |
| 2012/0164777 | A1 | 6/2012 | Jaeger et al. | |
| 2016/0167400 | A1 | 6/2016 | Ruiz Vega et al. | |
| 2021/0086541 | A1 | 3/2021 | Speer | |

FOREIGN PATENT DOCUMENTS

| | | |
|---|---|---|
| JP | S60071260 | 4/1985 |
| JP | S62184859 | 8/1987 |
| JP | S62218137 | 9/1987 |
| JP | S6377781 | 4/1988 |
| JP | S63290789 | 11/1988 |
| JP | H01108076 | 4/1989 |
| JP | H1245093 | 9/1989 |
| JP | H01301268 | 12/1989 |
| JP | H02591 | 1/1990 |
| JP | H02225053 | 9/1990 |
| JP | H02235643 | 9/1990 |
| JP | H624151 | 2/1994 |
| JP | H732774 | 2/1995 |
| JP | H7172074 | 7/1995 |
| JP | H7195834 | 8/1995 |
| JP | H8197862 | 8/1996 |
| JP | H09193391 | 7/1997 |
| JP | H7290837 | 5/1999 |
| JP | H11138773 | 5/1999 |
| JP | 2001158177 | 6/2001 |
| JP | 2001158182 A | 6/2001 |
| JP | 2001199170 | 7/2001 |
| JP | 2001253178 | 9/2001 |
| JP | 2008055618 | 3/2008 |
| JP | 2008520452 | 6/2008 |
| JP | 2010505640 | 2/2010 |
| JP | 2010083133 | 4/2010 |
| JP | 2012512067 | 5/2012 |
| JP | 2012144669 | 8/2012 |
| JP | 2015091647 | 5/2015 |
| JP | 2015134500 | 7/2015 |
| WO | 2008092650 | 8/2008 |
| WO | 2019154980 | 8/2019 |
| WO | 2019162212 | 8/2019 |
| WO | 2021047886 | 3/2021 |

* cited by examiner a
b
c
d
1
2
3
4 a
b
c
d
e
1
2
3
4
5
6
7 a
b
c
d
e
1
2
3
4
5
6
7

LASER PRINTING PROCESS

DESCRIPTION

Field of the Invention

The invention relates to a process for printing on a substrate, in which ink is transferred from an ink carrier to the substrate in accordance with a mandated pattern, the ink first being transferred with a transfer device from an ink reservoir onto the ink carrier. The invention further relates to a printing machine comprising an ink carrier for transferring ink to a substrate to be printed in accordance with a mandated pattern, and also to a transfer device for transferring ink onto the ink carrier.

Background of the Invention

A process for printing a substrate in which drops of ink are thrown from an ink-coated carrier onto a substrate to be printed is known from patent specification U.S. Pat. No. 6,241,344 B1. To transfer the ink, energy is introduced through the carrier into the ink on the carrier at the position at which the substrate is to be printed. This causes vaporization of a part of the ink, or of a liquid present in the ink, and so the ink parts from the carrier. As a result of the pressure of the vaporizing ink, the drop of ink thus parted is thrown onto the substrate.

By introducing the energy in a directed way it is possible hereby to transfer the ink onto the substrate in accordance with a pattern to be printed. The energy needed to transfer the ink is introduced, for example, by a laser. The carrier bearing the applied ink is, for example, a circulating ribbon, to which ink is applied by means of an application device before the printing region. The laser is located in the interior of the circulating ribbon, and so the laser acts on the carrier on the side facing away from the ink. Application of the ink to the ink carrier is accomplished, for example, by a roll which is immersed in an ink reservoir.

A printing machine of this kind is also known from patent specification U.S. Pat. No. 5,021,808 A. In accordance with the teaching of this document as well, ink is applied from a reservoir container, using an application device, to a circulating ribbon, there being situated within the circulating ribbon a laser by means of which the ink is vaporized at mandated positions and is thrown accordingly onto the substrate to be printed. The ribbon in this case is made of a material transparent to the laser. For targeted vaporization of the ink it is possible for the circulating ribbon to be coated with an absorption layer, in which the laser light is absorbed and is converted into heat, and so the ink is vaporized at the position of exposure to the laser.

When the methods described above are used to transfer liquid ink by means of a laser to an opposing substrate, the result will generally be an undefined “spot” with numerous neighbouring satellites (splashes). Furthermore, a great deal of energy is needed in order to part the drop from the ink-bearing layer on the ink belt and then to convey it in free flight onto the opposite substrate. Because of this it is necessary—especially in order to achieve printing speeds that are acceptably high—to use very powerful lasers, thus increasing the costs and limiting the possible applications.

OBJECT OF THE INVENTION

The invention is based, by comparison, on the object of providing a printing process, more particularly a laser printing process, wherein the above-described disadvantages of the prior art are at least reduced.

A particular object of the invention is to minimize the energy input needed for printing and to improve the printed image.

SUMMARY OF THE INVENTION

The object of the invention is already achieved according to the subject matter of claim 1.

Preferred embodiments of the invention are apparent from the subject matter of the dependent claims, from the description and from the drawings.

The invention relates to a printing process in which a substrate to be printed is disposed opposite an ink carrier having an ink layer. The invention relates more particularly to an on-line printing process.

The substrate is distant from the ink applied on the ink carrier, by means of a gap.

The substrate used may comprise a flexible sheet-like structure, more particularly a film, a nonwoven, a paper, a card or a textile material.

A substrate used may also be a rigid material, more particularly a material in plate form, such as a sheet of plastic, glass or ceramic, for example.

The ink layer is regionally heated in such a way as to form bulges in the ink layer.

In particular, the ink layer is heated by means of a laser which regionally heats the ink layer, preferably line by line, through the ink carrier, as a result of which the ink, particularly by virtue of vaporizing constituents, is heated and forms a bulge.

The laser used may in particular be a switched laser. According to one embodiment, the laser generates a grid of dots which forms the printed image. According to another embodiment, the laser runs in lines. Combinations of dots and lines are likewise conceivable.

The ink layer for generating a printed image, however, is not heated in such a way that the ink particles which form are split off and thrown in the direction of the substrate.

Instead, the energy input is so low that there is merely formation of bulges which span the gap between ink carrier and substrate.

In accordance with the invention, bulges contact the substrate, and ink splitting is brought about by relative movement between substrate and ink carrier.

The ink splitting is the process of ink transfer, particularly that in which a drop of ink goes onto the substrate, where it attaches permanently and forms a printed dot or a printed line.

Ink splitting is therefore brought about not solely by the laser but instead by the bulge attaching on the substrate and by the relative movement.

The attachment preferably takes place predominantly, more preferably exclusively, by forces of adhesion between the substrate and the drop of ink that forms.

Also conceivable, however, at least in a supporting function, is to utilize magnetic or electrostatic forces so that the bulge attaches on the substrate and so forms a drop which goes over onto the substrate.

As a result of the invention it is possible to reduce the laser power required. Moreover, formation of satellites around the transferred drop of ink can be largely avoided.

Through the process of the invention, resolutions of 300 dpi or more can be achieved.

For ink splitting, preferably, ink carrier and ink layer are moved parallel to one another. More particularly, the substrate is to be moved past a print head, and at the same time the print head is moved perpendicularly to the direction of movement of the substrate, and so prints the substrate line by line.

A further possibility, moreover, is to move the print head over the substrate meanderingly, the substrate in the case of this embodiment of the invention being preferably printed while stationary.

In the case of a further embodiment of the invention, the substrate, after the particular implementation of the print head has made contact, is moved away perpendicularly. In the case of this embodiment, therefore, ink splitting is accomplished by an enlargement of the gap between ink carrier and substrate.

Substrate and ink carrier are preferably moved relative to one another at a speed which corresponds at least to the printing speed, more preferably at at least double the printing speed. This allows a clean printed image and/or a high resolution to be achieved.

According to one preferred embodiment of the invention, the substrate during the contacting of the bulge with the substrate is guided past the ink layer at a distance of greater than 0.01 mm and/or less than 3 mm, preferably greater than 0.1 mm and/or less than 1 mm, more preferably greater than 0.1 mm and/or less than 0.5 mm.

This is independent of whether the ink carrier is moved in the opposite direction to the substrate or not.

If ink ribbon and substrate are moved counter to the direction of printing, however, ink splitting can be improved.

The printing speed is the rate of advance of the substrate relative to the laser or, in the case of a stationary substrate, the speed at which a laser unit moves over the substrate in the direction of printing.

With the process of the invention it is possible to apply ink layers 1 to 100 μm, preferably 10 to 50 μm, thick to the substrate.

The ink layer is more particularly a wet ink layer which is disposed on a laser-permeable ink carrier.

The ink carrier used according to one embodiment of the invention comprises a polymeric film, more particularly a polyimide film.

The polymeric film may be configured in particular as a circulating ribbon which in order to produce an ink layer is guided through an inking unit, more particularly a nip inking unit.

The invention allows in particular for the printing of an ink comprising effect pigments, metal particles and/or particles having a mean diameter of more than 1 μm, preferably more than 5 μm.

Hence it is possible, firstly, to print large effect particles, such as sparkle pigments, for example.

Moreover it is possible—in order to print electrical conductor tracks, for example—to use inks comprising metal particles, more particularly comprising particles of copper or of silver.

In one embodiment, the ink after printing is baked. In this way, in particular, metal particles can be sintered, in order to generate heat-resistant, electrically conducting layers.

It is also possible for two or more ink layers to be applied one above another. By virtue of the large layer thicknesses that can be achieved, it is possible accordingly to provide even three-dimensional structures in virtually any desired height.

The invention further relates to a printing machine which is configured for executing the process described above.

This machine preferably comprises a print head, which by means of a laser, through an ink carrier, carries out regional heating of an ink layer on the ink carrier in such a way that bulges are produced in the ink layer.

The printing machine is configured such that the substrate to be printed is guided past through a gap at a distance from the ink carrier bearing the ink layer. The bulges make contact with the substrate and, through the movement of the substrate relative to the ink carrier, ink splitting occurs, and so a drop of ink goes onto the substrate.

BRIEF DESCRIPTION OF THE DRAWINGS

The subject matter of the invention is to be elucidated in more detail below by means of an exemplary embodiment with reference to the schematic drawings FIG. 1 to FIG. 7.

Represented schematically in the drawings, in each of FIG. 1 to FIG. 6, is the course of the process of the invention when applying a printed dot.

DETAILED DESCRIPTION OF THE DRAWINGS

Figures 1, 2, 3:
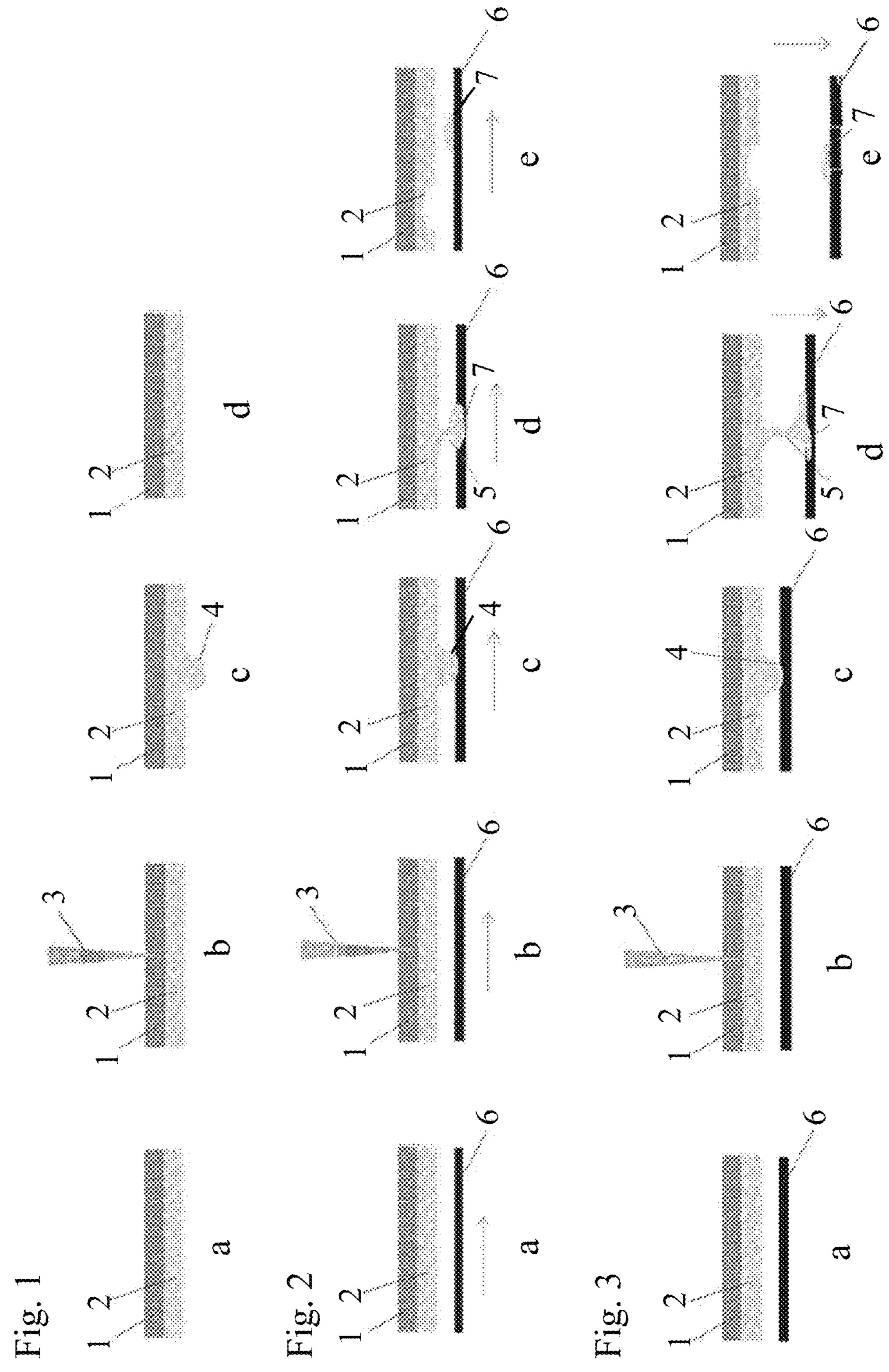

With reference to FIG. 1, the fundamental steps of the printing process of the invention will be elucidated.

In step (a), an ink (2) to be printed, which forms an ink layer (2), is located on an ink carrier (1). By means of a preferably switched laser bombardment with a writing laser (3) in step (b), a part of the ink (2), more particularly a solvent which the ink comprises, is heated, and so a bulge (4) is formed from the ink (2), as shown in step (c), this bulge, however, not leading, or leading only minimally, to detachment of ink. Since, as represented here in step (d), the bulge (4) is unable to attach by forces of adhesion to any substrate positioned beneath it, the bump retracts at least partly and there is little or no ink transfer. Printing therefore takes place, in accordance with the invention, only if a substrate is sited beneath the ink carrier (1) having the ink layer, in such a way that the bulge (4) makes contact with the substrate.

FIG. 2 shows fundamentally the same construction as in FIG. 1, there now being a substrate (6) to be printed located beneath the ink carrier (1) and the ink layer (2) (step a). As a result of laser bombardment (3), the ink layer (2) bulges in the direction of the substrate (6) to be printed (steps b-c). Contact occurs between the substrate (6) and the ink bulge (4) (step c). As a result of a difference in speed between the ink bulge (4) and the substrate (6), there is a necking (5) of the ink (step d). Lastly, ink splitting occurs, with at least part of the ink bump (4) transferring (e) onto the substrate (6) as a transferring ink dot (7).

FIG. 3 shows fundamentally the same construction as FIG.1 and FIG. 2. In contrast to FIG. 2, the substrate (6) here is moving not parallel to the ink carrier (1) and the ink layer (2), but instead in a perpendicular direction. Ink detachment owing to vertical changes in position between substrate (6) and the ink bulge (4) leads equally to a splitting of ink between ink bump (4), substrate (6) and ink layer (2).

A combination of mutually parallel and mutually perpendicular movement of substrate (6) and ink carrier (1), in other words a combination of the processes shown in FIG. 2 and FIG. 3, is also possible.

Figure 4:
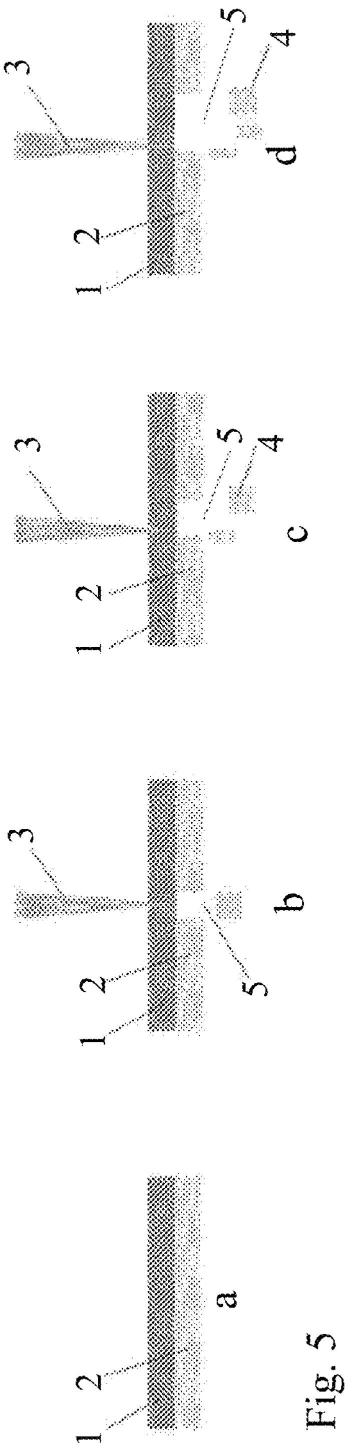

FIG. 4 shows the result if the ink carrier (1) comprising the ink layer (2) is moved more slowly relative to the substrate than the printing speed. The substrate is not shown in FIG. 4 (and also in FIG. 5 and FIG. 6).

As a result of the slower speed of the ink carrier (1) relative to the substrate, the writing laser (3) pulses repeatedly into the ink region (5) of the ink carrier (1) that has already emptied. The amount of ink transferring in the region of the bulge (4) here is smaller than the amount of ink of the preceding shot, because the writing laser (3) no longer encounters a fully filled ink region (2). As a result, the quality of the printed image deteriorates as the laser power goes down. The resulting printed image of unstable quality is, however, able to be used for the purpose, for example, of solid areas for transfer, or for digital ink spraying.

Figure 5:
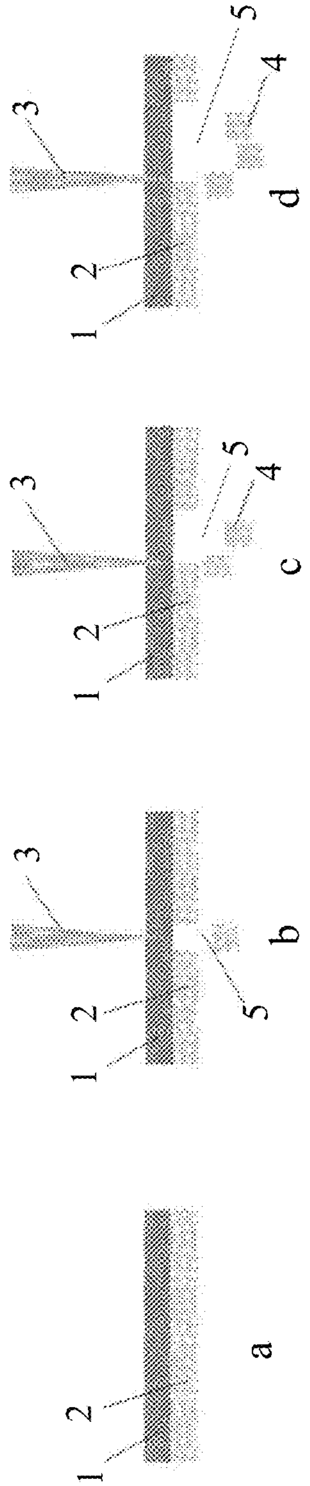

FIG. 5 shows the result if ink carrier (1) and ink layer (2) are moving at printing speed. In this case, the writing laser (3) always encounters a partly emptied ink region (5), and so it is no longer possible to print the same amount of ink as in the preceding laser shot. In this case, the quality of the printed image produced is again unstable as the laser power goes down, but the process can likewise be used for solid areas to be transferred, or for digital ink spraying.

Figure 6:
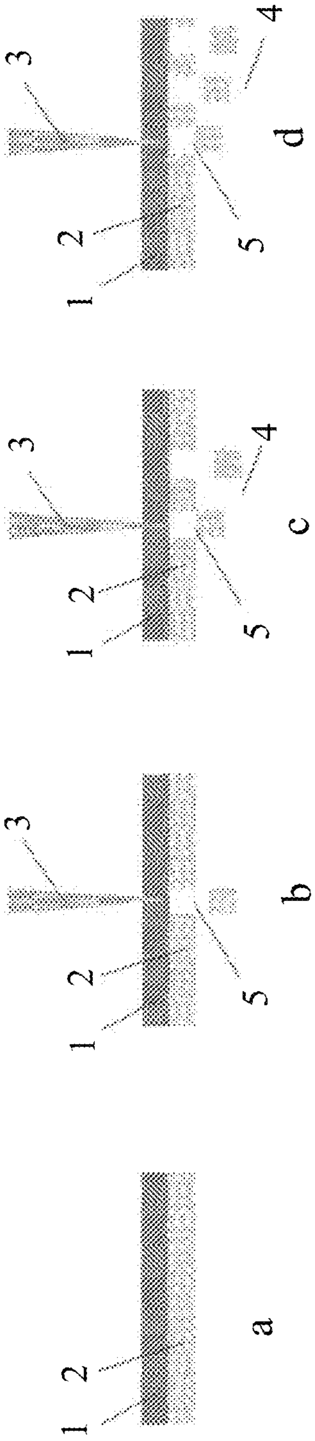

FIG. 6 shows the printing procedure according to one preferred embodiment of the invention. In this case the ink carrier (1) comprising the ink layer (2) moves relative to the substrate faster than the printing speed. As a result, the writing laser (3) always encounters a fully filled ink region (2). Under these conditions, a stable and high-quality printed image can be produced with a higher laser power.

Described below are the results of the printing process of the invention in the context of various parameters.

The following typical system settings lead to the following print outcomes:

Settings 1 (as depicted in FIG. 5):

ink ribbon: continuous polymer ribbon, laser: solid-state laser, especially 800-1800 nm, laser power: 1-500 kW/mm$^2$, writing focus: 20-100 μm, thickness of ink layer on ink carrier: 20-50 μm, ink viscosity: 500-10 000 mPa s, preferably 1000-5000 mPa s, speed of ink carrier: 0.9-1.1*printing speed, distance of ink carrier to the substrate: approx. 0.5-2 mm, printing speed: 1-10 m/min, and/or printing width: 10-2000 mm This produces a homogeneously printed surface with a wet ink film layer whose thickness corresponds approximately to the thickness of the ink layer on the ink carrier.

Settings 2 (as depicted in FIG. 6):

ink ribbon: continuous polymer ribbon, laser: solid-state laser, especially 800-1800 nm, laser power: 1-500 kW/mm2, writing focus: 20-100 μm, thickness of ink layer on ink carrier: 20-50 μm, ink viscosity: 500-10 000 mPa s, preferably 1000-5000 mPa s, speed of ink carrier: 2.5-3.5*printing speed, distance of ink carrier to the substrate: approx. 0.1-0.5 mm, printing speed: 1-10 m/min, and/or printing width: 10-2000 mm This produces a homogeneously printed surface and also a detailed pattern with a wet ink film layer whose thickness corresponds approximately to the thickness of the ink layer on the ink carrier.

The invention achieves ink separation between ink carrier and substrate by mechanical means. As a result, all that is needed additionally is the laser energy in order to achieve a partial positional change of the selected ink layer in the direction of the print substrate. The laser bombardment now brings about only a bulge of the ink in the direction of the substrate; the subsequent contact of the ink made to bulge by the laser, and the difference in speed between substrate and ink film, then lead to ink separation. For the mechanical ink separation, a difference in speed between ink ribbon and print substrate is not absolutely necessary; a positional change of ink ribbon relative to print substrate in terms of height produces the same effect.

If there is no contact between the “ink bump” and the substrate, ink transfer is very limited, or there is no ink transfer at all, owing to elastic contraction of the ink bump.

For the printing process of the invention, in general, relative to a conventional printing process in which drops of ink are shot out by means of the laser, only a fraction of the laser energy is required, with a simultaneous reduction in the scattering splashes. This leads to a considerable boost in quality of the printed image in conjunction with an increase in the printing speed.

When adjusting the difference in speed between ink ribbon and substrate, the ink ribbon speed ought not to be below the printing speed that is to be generated, if the printed image is to be stable. In this context it is immaterial whether the ink ribbon moves in the direction of the substrate or the ink to be printed is transported in the opposite direction. The decisive factor is the establishment of a difference in speed between ink ribbon and substrate.

The minimum ink ribbon speed is preferably the printing speed.

If ink ribbon speed is less than printing speed, then ink transfer is uncontrolled, since ink in that case is to be transferred from regions of the ink ribbon that are already being depleted of ink, thus leading to inhomogeneities.

If the ink ribbon speed is the same as the printing speed, then the laser power required is lower in principle; however, because of the uneven transfer of ink, the printed image is also uneven.

If the ink ribbon speed is greater than printing speed, then it is true that a greater laser power is needed in order to transfer the ink; however, the precision of printing becomes higher as the ribbon speed goes up. Optimum print precision can be achieved with an ink ribbon speed that is around 2-3 times the printing speed, with the direction of movement of the ink ribbon having no part to play.

Figure 7:
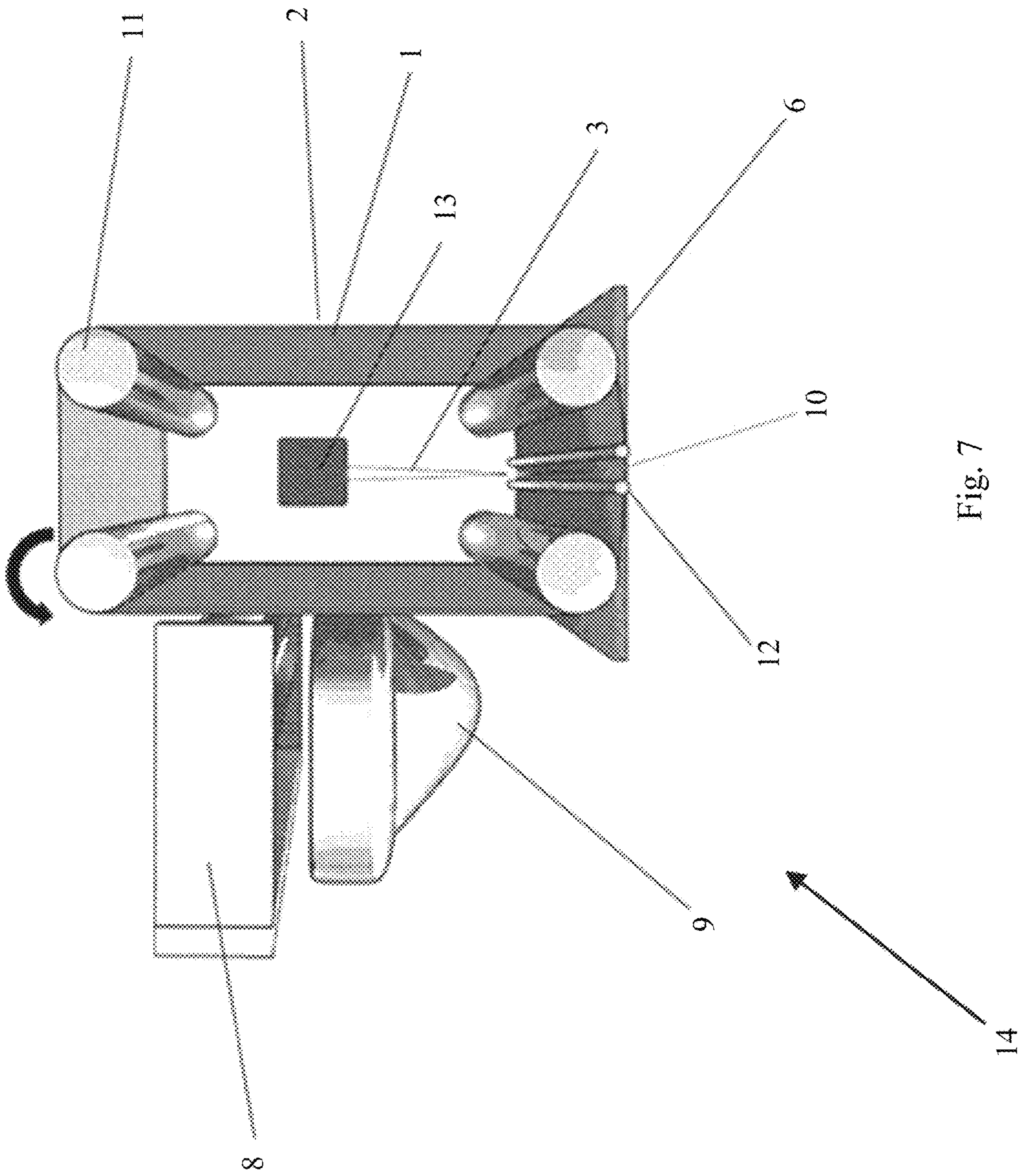
FIG. 7 shows schematically a printing machine of the invention.

FIG. 7 is a schematic view of an exemplary embodiment of a printing machine (14) of the invention.

The ink carrier (1) of the printing machine (14) is a circulating ink ribbon.

The ink ribbon is coated homogeneously and over its full area with ink (2) by the inking unit (8). The ink ribbon then moves in the direction of the arrow to the printing nip (10). Here, the ink carrier (1) is distanced from the substrate (6) to be printed, by means of a gap. The width of the gap is preferably adjustable and/or is regulated continuously. This can be done, for example, by means of adaptable distancing rolls (12).

In the printing nip (10), a laser beam (3) is focused by the ink carrier (1) into the ink (2) with a laser scanner. The local and targeted heating of parts of the ink (2) by means of the laser beam (3) causes explosive vaporization of a small region of the ink (2), and so a part of the printing ink (2) parts to some extent from the ink ribbon (1), and a bulge is formed and is subsequently transferred contactingly onto the opposite substrate (6). The printing nip (10) is therefore configured in such a way that a bulge in the ink spans the nip.

Subsequently, controlled by the distancing rolls (12) and the deflection rollers (11), the ink ribbon moves back in the direction of the inking unit (8). The contact between inking unit (8) and the ink ribbon replenishes the ink (2) that has been consumed. The excess ink (2) in the inking unit (8) is collected in the ink trough (9) at the bottom, and is added continuously and repeatedly to the printing operation.

As a result of the invention, success has been achieved in producing an improved printed image for a significant reduction in laser power.

LIST OF REFERENCE NUMERALS

1. Ink carrier
2. Ink/ink layer/ink region
3. Writing laser/laser bombardment/laser beam
4. Bulge/ink bulge
5. Ink necking/emptied ink region
6. Substrate
7. Ink dot
8. Inking unit
9. Ink trough
10. Printing nip
11. Deflection roller
12. Distancing roll
13. Laser scanner
14. Printing machine

The invention claimed is:

1. A printing process comprising:
disposing a substrate to be printed opposite an ink carrier including an ink layer,
regionally heating the ink layer in such a way that a bulge is formed in the ink layer, wherein the bulge contacts the substrate, and
moving the substrate relative to the ink carrier to thereby cause ink splitting onto the substrate.

2. The printing process according to claim 1, wherein the ink layer is regionally heated by a laser.

3. The printing process according to claim 1, wherein the ink carrier and the ink layer are moved parallel to one another.

4. The printing process according to claim 1, wherein the substrate and the ink carrier are moved relative to one another at a speed which corresponds at least to the printing speed.

5. The printing process according to claim 1, wherein when the bulge contacts the substrate, the substrate is guided past the ink layer at a distance of greater than 0.01 mm and/or less than 3 mm.

6. The printing process according to claim 1, wherein a printed ink layer applied to the substrate has a thickness of 1 to 100 μm.

7. The printing process according to claim 1, wherein the ink layer is a wet ink layer disposed on the ink carrier and the ink carrier is laser-permeable.

8. The printing process according to claim 1, wherein the ink layer includes an ink comprising one or more of effect pigments, metal particles, and particles, the one or more of effect pigments, metal particles, and particles having a mean diameter of more than 1 μm.

9. The printing process according to claim 1, the process further comprising one or more of baking a printed ink and applying two or more ink layers one above another.

10. The printing process according to claim 2, wherein the ink layer is regionally heated by a switched laser.

11. The printing process according to claim 4, wherein the substrate and the ink carrier are moved relative to one another at a speed which corresponds at least to double the printing speed.

12. The printing process according to claim 1, wherein when the bulge contacts the substrate, the substrate is guided past the ink layer at a distance of greater than 0.1 mm and/or less than 1 mm.

13. The printing process according to claim 1, wherein when the bulge contacts the substrate, the substrate is guided past the ink layer at a distance of greater than 0.1 mm and/or less than 0.5 mm.

14. The printing process according to claim 6, wherein a printed ink layer applied to the substrate has a thickness of 10 to 50 μm.

15. The printing process according to claim 7, wherein the ink carrier comprises a polymeric film.

16. The printing process according to claim 15, wherein the polymeric film includes a polyimide film.

17. The printing process according to claim 1, wherein the ink carrier comprises a polymeric film.

18. The printing process according to claim 17, wherein the polymeric film includes a polyimide film.

19. The printing process according to claim 8, the one or more of effect pigments, metal particles, and particles having a mean diameter of more than 5 μm.

20. A printing process comprising:
opposing a substrate to an ink carrier including an ink layer to provide a gap between the substrate and the ink layer,
heating the ink layer to form a bulge in the ink layer, the bulge spanning the gap, and
providing relative movement between the substrate and the ink carrier and splitting at least a portion of the bulge from the ink layer onto the substrate.

21. A printing machine comprising:
an ink carrier including an ink layer, and
a laser scanner,
the printing apparatus being configured to perform a process comprising:
disposing the ink carrier opposite a substrate to be printed,
regionally heating the ink layer with a laser emitted from the laser scanner to form a bulge in the ink layer, and
splitting ink onto the substrate by permitting the bulge to contact the substrate and moving the substrate relative to the ink carrier.

* * * * *